United States Patent
Penna et al.

(10) Patent No.: US 8,068,545 B2
(45) Date of Patent: Nov. 29, 2011

(54) METHOD AND APPARATUS FOR PROCESSING IMAGE DATA

(75) Inventors: David E. Penna, Redhill (GB); Richard M. Miller-Smith, Oxted (GB); Colin I. King, Crawley (GB)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1554 days.

(21) Appl. No.: 10/574,143

(22) PCT Filed: Oct. 1, 2004

(86) PCT No.: PCT/IB2004/051944
§ 371 (c)(1),
(2), (4) Date: Mar. 29, 2006

(87) PCT Pub. No.: WO2005/034516
PCT Pub. Date: Apr. 14, 2005

(65) Prior Publication Data
US 2006/0291560 A1    Dec. 28, 2006

(30) Foreign Application Priority Data
Oct. 4, 2003  (GB) .................................... 0323284.0

(51) Int. Cl.
H04N 7/12 (2006.01)
H04N 11/02 (2006.01)
H04N 11/04 (2006.01)
(52) U.S. Cl. ................................................. 375/240.25
(58) Field of Classification Search ............ 375/240.01, 375/240.16, 240.25, 240.26
See application file for complete search history.

(56) References Cited

U.S. PATENT DOCUMENTS

| 5,420,703 | A | * | 5/1995 | Sakai et al. ........... 358/501 |
| 5,677,774 | A | * | 10/1997 | Kunishi et al. ........ 358/448 |
| 5,874,995 | A | * | 2/1999 | Naimpally et al. ..... 375/240.25 |
| 5,909,224 | A | | 6/1999 | Fung |
| 5,912,676 | A | | 6/1999 | Malladi et al. |
| 5,920,352 | A | | 7/1999 | Inoue |

(Continued)

FOREIGN PATENT DOCUMENTS
EP    0849953    6/1998
(Continued)

OTHER PUBLICATIONS

Feng, W-C, et al.: "Improving Data Caching for Software MPEG Video Decompression", Proceedings of the SPIE, SPIE, Bellingham, VA, US, vol. 2668, Jan. 31, 1996, pp. 94-104.

(Continued)

*Primary Examiner* — Jean B Corrielus
(74) *Attorney, Agent, or Firm* — DLA Piper LLP (US)

(57) ABSTRACT

An MPEG decoder (100-180) can use different formats (linear tiled etc) for image data memory (150) for reference pictures when decoding subsequent pictures. Each format brings advantages and disadvantages. The disclosure illustrates that it is possible for different video sequences to have characteristics which match one image buffer format well, but not another, for example where there is a lot of motion or only a little motion between images. Advantageously, the decoder employs a parameterised image buffer format and analysis of the incoming stream and/or measured decoding performance (190) so as to dynamically choose (90, 160, 170) the best image buffer format for the current part of a stream. Cache control features can also be controlled (198) to suit the particular data received.

52 Claims, 5 Drawing Sheets

U.S. PATENT DOCUMENTS

| | | | |
|---|---|---|---|
| 6,023,295 A | | 2/2000 | Pau |
| 6,046,778 A * | | 4/2000 | Nonomura et al. ............ 348/565 |
| 6,424,752 B1 * | | 7/2002 | Katayama et al. ............. 382/284 |
| 6,449,390 B1 * | | 9/2002 | Inoue ............................. 382/168 |
| 6,515,698 B1 * | | 2/2003 | Sasaki et al. ................ 348/231.6 |
| 6,831,634 B1 * | | 12/2004 | Shigeta .......................... 345/213 |
| 7,012,623 B1 * | | 3/2006 | Kusama et al. ................ 345/634 |
| 7,079,129 B2 * | | 7/2006 | Shigeta .......................... 345/213 |
| 7,099,394 B2 * | | 8/2006 | Kohno ..................... 375/240.25 |
| 2004/0041926 A1 * | | 3/2004 | Takano et al. ................. 348/241 |

FOREIGN PATENT DOCUMENTS

| | | |
|---|---|---|
| EP | 0917375 | 5/1999 |
| EP | 1091591 | 4/2001 |
| JP | 2001-22638 | 1/2001 |
| WO | WO 99/16252 | 4/1999 |
| WO | WO 02/056600 | 7/2002 |

OTHER PUBLICATIONS

Jaspers, Egbert G.T. et al.: "Bandwidth Reduction for Video Processing in Consumer Systems", IEEE Trans. On Consumer Electronics, Sep. 2001, vol. 47, No. 4, pp. 885-894.

Kim, Hansoo et al.: "High-Performance and Low-Power Memory-Interface Architecture for Video Processing Applications", IEEE Transactions on Circuits and Systems for Video Technology, Nov. 2001, vol. 11, No. 11, pp. 1160-1170.

Soderquist, P. et al.: "Optimizing the Data Cache Performance of a Software MPEG-2 Video Decoder", Proceedings ACM Multimedia 97. Seattle, Washington, Nov. 9-13, 1997, Reading, Addison Wesley, US, vol. CONF. 5, Nov. 1997, pp. 291-301.

* cited by examiner

METHOD AND APPARATUS FOR PROCESSING IMAGE DATA

RELATED APPLICATIONS

This application is a 371 of PCT/IB2004/051944 filed Oct. 1, 2004 and claims the benefit of the United Kingdom Priority Application No. 0323284.0 filed Oct. 4, 2003.

FIELD OF THE INVENTION

The invention relates to method and apparatus for arranging image data within an image processor's memory. The invention has particular application in the field in decoding block-based encoded image data, such as MPEG video streams.

BACKGROUND OF THE INVENTION

Digital transmission and storage systems generally use block-based compression, as used in the well known JPEG or MPEG formats, to achieve acceptable image quality within the available transmission bandwidth and storage capacity. JPEG is a video compression system based upon performing Discrete Cosine Transformation (DCT) on groups, or blocks, of pixel data. MPEG is a motion video compression system based upon the same principles, but with additional features to support motion between image frames. To achieve substantial data compression, the DCT coefficients representing each block of pixels are subjected to adaptive quanfisation and Variable Length Encoding (VLE). Blocks are also grouped together in fours, to form "Macroblocks", and chrominance (colour) components are represented with half the spatial resolution provided for luminance (brightness) component. These techniques can be applied in both still images (JPEG) and motion video (MPEG). For moving pictures, temporal redundancy between image frames is identified and significantly reduced using motion-compensated inter-frame predictive encoding.

The terminology used for describing MPEG sequences includes 'frames', which contain a complete image, and 'fields', which are half an image, arranged every other line. The unit of decoding, however, is a picture, which can be field or frame structured. An image buffer is used to store both frames and/or fields, depending upon the storage format employed.

Three image picture types, known as 'I', 'B' and 'P' pictures, are used to construct an image sequence for transmitting data across a restricted channel between an encoder and a decoder. A "channel" includes bandwidth-limited communication links and storage of imagery on mass storage media such as hard drives, Compact Disks or video tape (where it is desirable to maximise storage efficiency). 'I' picture frames are "intra" frames, which are similar in construction to a single JPEG frame and contain a complete, moderately compressed, frame of image data. 'P' picture frames are "predictive" frames and are encoded with reference to a previous 'I' or 'P' frame (known as 'key frames') within a video stream. 'B' picture frames are "bi-directional interpolated" frames which require both earlier and later reference frames in order to be encoded.

To support production of an MPEG image sequence data has to be stored in image memory. When 'B' or 'P' frames are being produced, one or two previous source I or P images must have been stored and are referenced to provide motion prediction data.

A typical arrangement for an image processor performing MPEG processing comprises modules (in hardware or software) for inputting data, converting the image between analogue and digital domains (in either direction, depending on whether the processor is an encoder or a decoder), storing the data, performing compression or decompression on the data, compensating for motion, and for outputting the data for subsequent use, such as display.

In order to provide an implementation that is reliable, efficient and providing high quality output, it must be designed to accommodate worst-case conditions which as a result of processor overload would result in frame skipping or other image artefacts that degrade image quality. Furthermore, memory bandwidth is a crucial issue for both hardware and software implementations.

In order to maximise throughput (and therefore reduce the opportunity for processor overload), processors often employ a cache memory with a very high access speed, allowing the processor to obtain data very rapidly. The cache is arranged so that as much data as possible is sourced from the cache, rather than from slower "external" memory. For software implementations in particular, cache size and traffic are often crucial performance-determining factors. Worst-case performance can be significantly affected by cache activity, as it is possible for prediction data to be sourced from widely separated parts of input images resulting in significant "cache thrashing" (significant and substantially unnecessary cache use and discarding of content).

Image memory is often provided as "paged" memory, whereby image data for a picture is stored over many pages, each of which is accessed by the processor by page access. Page access is a very rapid way of accessing data from a paged Random Access Memory (RAM), requiring only the provision by the processor of a base address, after which the data is clocked out and passed to the processor without provision of further addressing to the memory. However, page crossings are inefficient, as they require termination of the current paged memory transfer and generation of new addressing for the next set of data transfer.

It is understood in the field of MPEG image processing that when paged memory is used different storage formats provide different advantages, depending upon the content of the images being processed. Storing image data on a linear basis (for example, following a raster scan) minimises the complexity required to subsequently display the image. However, when linear storage is used for a reference frame of image data for use in motion compensation/reconstruction, retrieval of reference data may require a large number of memory page crossings. Alternatively, storing reference image data in "tiled format" (where two-dimensional blocks of pixels as used in the coding process are stored in sequence in memory) reduces the number of page crossings by taking advantage of the fact that image pixels naturally have a two-dimensional spatial relationship. With this in mind U.S. Pat. No. 5,912,676 describes a re-configurable image memory interface for storing or retrieving image data to/from the memory according to different image storage formats, such as scan line (raster), tiled or "skewed-tiled" formats. However, the present inventors have recognised that, since the content of picture sequences varies greatly in the amount and nature of motion between the frames or fields that make up each picture, it is not possible to select a configuration for the reference data memory that will be the optimum one for all sequences. Accordingly, the US patent provides a range of configurations that may be advantageous if properly selected, but does not define what is the proper configuration. Nor is it possible to define a single configuration that will be optimal in all sequences. The optimal configuration may further depend on what steps are to be performed on the image data after decoding. The need for conversion to another format for a subsequent processing stage may for example negate any saving by adopting a preferred format for a motion estimation stage.

BRIEF SUMMARY OF THE INVENTION

It is an object of the invention to provide method and apparatus for decoding MPEG sequences using flexible and dynamically re-configurable image memory storage formats, selected automatically according to detected characteristics of an image stream being processed.

The invention in a first aspect provides a method of arranging image data representing a motion picture sequence within a memory sub-system in an image data processing system, the method comprising dynamically selecting the arrangement of image data for successive pictures of said sequence in said memory according to at least one of: measured characteristics of said image data, measured characteristics of the performance of said processing system, and known characteristics of subsequent processing of said image data within said image processing system. Such an arrangement allows the system designer for example to optimise the use of a cache and paging within a memory sub-system and thereby improve throughput, by ensuring that the most appropriate memory storage formatting is being used for a given image stream (for example, different formatting is required to maximise throughput for interlaced and non-interlaced image formats), processor performance and/or image destination.

The memory sub-system may include an image data storage memory constructed from paged memory.

Said memory sub-system may include a processor cache memory in addition to a main image data storage memory.

The step of selecting the arrangement of image data in storage memory may comprise selecting between a linear format, whereby image data is stored in memory on a line-by-line basis, and at least one kind of tiled format, whereby two-dimensional groups of pixels are grouped in memory.

Where the memory sub-system includes cache memory, said tiled format is preferably defined such that data for one tile corresponds to a whole number of cache blocks.

The method may comprise measuring one or more of the following as characteristics of the image data to influence the selection of the arrangement of data in memory:
  A. variability of motion vectors encoded within the received data. For example, where motion is zero or at least relatively constant across the image being decoded, it may be efficient to store the reference image in linear format. Where motion vectors are highly variable, tiled or other formats will be preferred to a simple linear format;
  B. picture type. For example, to maximise efficiency of processing a key picture (I or P), a format that is more efficient for other pictures to predict from may be selected, such as a tiled storage format;
  C. encoded data size per picture of the sequence;
  D. structure of a picture from which the image data is derived (for example, whether an image frame is arranged as a single non-interlaced frame, or interlaced fields);
  E. structure employed for storing an image in image memory, such as where fields for an image frame are stored separately;
  F. constant characteristics of the stream obtained by decoding the sequence header of the image stream, such as image resolution. For example, an image having low resolution (determined from the sequence header) may be processed more efficiently using a linear organisation for storage, as many display lines can fit within the data cache and the layout is optimised for image reconstruction. However, a high resolution image may benefit from storage in a tiled format, to minimise cache stalls and/or page crossing.

It will be appreciated that a measured characteristic such as variability of motion vectors for a P picture, is not normally available until the reference picture has been decoded and stored already. Accordingly, the method may look ahead in motion picture sequence so as to measure said characteristics of the image data for a given portion of the sequence and select the memory arrangement prior to processing that portion.

Alternatively, or in addition, however, measured characteristics of the image data at one part of the sequence are used effectively to predict characteristics of a subsequent portion of the sequence, and the memory arrangement selected according to measured characteristics of recently processed portions of the sequence.

The measurement of image data characteristics may be averaged over a period of time.

Where the variability of motion vectors is measured, it may be measured separately between vertical and horizontal planes, each having a different effect in the selection of the storage arrangement. (Variability which is purely horizontal may still favour a linear storage format.)

The method may alternatively or in addition comprise measuring one or more of the following as characteristics of system performance to influence the selection of the arrangement of data in memory:
  G. data cache stall rates in the memory sub-system;
  H. processor utilisation (for example by measuring processor percentage idle time);
  I. quality of service, or other such qualitative measurements that are perceptible to the end user of the content being processed;
  J. bandwidth of a link feeding data into or out of said image processor.

Where the memory sub-system includes cache memory, measurement of system performance may include measurement of data cache stall rates during image reconstruction.

System performance may be measured at least partly on a test basis using a sample of data, prior to processing the data. Alternatively, system performance measured while processing a first part of the sequence may be used to influence the arrangement of memory for a subsequent part of the sequence.

The method may alternatively or in addition comprise using knowledge of subsequent processing steps to influence the selection of the arrangement of data in memory. This can be done to take account of the need for conversion between formats for different types of processing steps.

The selection of memory arrangement may be implemented at least partly by changing parameters used by memory-accessing program code. Alternatively the selection of memory arrangement may be done by selecting different versions of code to be executed. These two options may be used together, depending on the number and nature of the different arrangements.

According to a second aspect of the invention, which may used independently or in addition to the aspect set forth above, the invention provides a method of processing image data representing a motion picture sequence within a memory sub-system in an image data processing system, the memory sub-system including processor cache memory in addition to main image data storage memory, the method comprising selectively using cache-handling functions under program control, according to at least one of measured characteristics of said image data and measured characteristics of the performance of said processing system.

Some types of processor provide for program-controlled cache-handling functions. For example a block allocation function may be provided, or a pre-fetch operation. However, the inventors have recognised that, as with the selection of memory arrangement, usage of these will not necessarily be equally advantageous for all image sequences, and could be counter-productive in some circumstances.

Accordingly, a block allocation function, whereby a new cache-block is allocated and overwritten without pre-loading it from the main memory, may be selectively used according to said measured characteristics. For example, it may be possible to use block allocation more often when utilising a tiled format for storage, thus improving processor throughput.

In addition, cache pre-fetching may be activated selectively in accordance with the measured characteristics. Pre-fetch tends to be speculative, and risks wasting bandwidth. However, use of a tiled format means that fewer cache-blocks are being processed, and thus less data that is being pre-fetched is ultimately discarded unused.

Where the first and second aspects of the invention are both in use, selection of the arrangement of memory and the usage cache-handling function may be performed according to the same characteristics or different characteristics, among those listed above.

The invention further provides an image data processing system, the processing system including a memory sub-system and means for dynamically selecting the arrangement of image data for successive frames of said sequence in within said memory sub-system according to at least one of: measured characteristics of said image data, measured characteristics of the performance of said processing system, and known characteristics of subsequent processing of said image data within said image processing system.

The memory sub-system may include an image data storage memory constructed from paged memory.

Said memory sub-system may include a processor cache memory in addition to a main image data storage memory.

The means for selecting the arrangement of image data in storage memory may be arranged for selecting between a linear format, whereby image data is stored in memory on a line-by-line basis, and at least one kind of tiled format, whereby two-dimensional groups of pixels are grouped in memory.

Where the memory sub-system includes cache memory, said tiled format may be defined such that data for one tile corresponds to a whole number of cache blocks.

The selecting means may include means for measuring one or more of the following as characteristics of the image data to influence the selection of the arrangement of data in memory:
  A. variability of motion vectors encoded within the received data;
  B. picture type;
  C. encoded data size per picture of the sequence;
  D. structure of a picture from which the image data is derived;
  E. structure employed for storing an image in image memory;
  F. constant characteristics of the stream obtained by decoding the sequence header of the image stream.

The measuring means may be arranged to look ahead in the motion picture sequence so as to measure said characteristics of the image data for a given portion of the sequence and select the memory arrangement prior to processing that portion.

Alternatively, or in addition, the selecting means may be arranged such that measured characteristics of the image data at one part of the sequence are used effectively to predict characteristics of a subsequent portion of the sequence, and the memory arrangement controlled according to measured characteristics of recently processed portions of the sequence.

The measuring means may include means for averaging measured image data characteristics over a period of time.

Where the measuring means is arranged to measure variability of motion vectors, it may be arranged to do so separately between vertical and horizontal planes, each having a different effect in the selection of the storage arrangement.

The selecting means may alternatively or in addition comprise means for measuring one or more of the following as characteristics of system performance to influence the selection of the arrangement of data in memory:
  G. data cache stall rates in the memory sub-system;
  H. processor utilisation (for example by measuring processor percentage idle time);
  I. quality of service, or other such qualitative measurements that are perceptible to the end user of the content being processed;
  J. bandwidth of a link feeding data into or out of said image processor.

Where the memory sub-system includes cache memory, the means for measuring system performance may be arranged to measure data cache stall rates during image reconstruction.

The means for measuring system performance may be arranged to do so on a test basis using a sample of data, prior to processing the data. Alternatively, the selecting means and means for measuring system performance may be arranged such that system performance measured while processing a first part of the sequence is used to control the arrangement of memory for a subsequent part of the sequence.

The selecting means may alternatively or in addition be arranged to use knowledge of subsequent processing steps to influence the selection of the arrangement of data in memory.

The image processing system may be implemented at least in part by program code and a programmable processing unit.

The selecting means may be implemented by means for changing parameters used by said program code in accessing said memory sub-system. Alternatively the selecting means may be done by selecting different versions of code to be executed.

According to the third aspect of the invention, the invention further provides an image data processing system including a memory sub-system for storing image data representing a motion picture sequence being processed, the memory sub-system including processor cache memory in addition to main image data storage memory, the system being arranged for using cache-handling functions selectively under program control, according to at least one of measured characteristics of said image data and measured characteristics of the performance of said processing system.

The system may be arranged such that a block allocation function, whereby a new cache-block is allocated and over-written without pre-loading it from the main memory, will be selectively used according to said measured characteristics.

The system may be arranged such that cache pre-fetching will be activated selectively in accordance with the measured characteristics.

The invention yet further provides a computer program product, whether on a physical storage device or delivered through some other channel, comprising instructions for causing a data processing system to implement the steps of a method or the features of an apparatus embodying the invention as set forth above

BRIEF DESCRIPTION OF THE DRAWINGS

Embodiments of the invention will now be described, by way of example only, by reference to the accompanying drawings, in which.

DETAILED DESCRIPTION OF THE INVENTION

Figure 1:
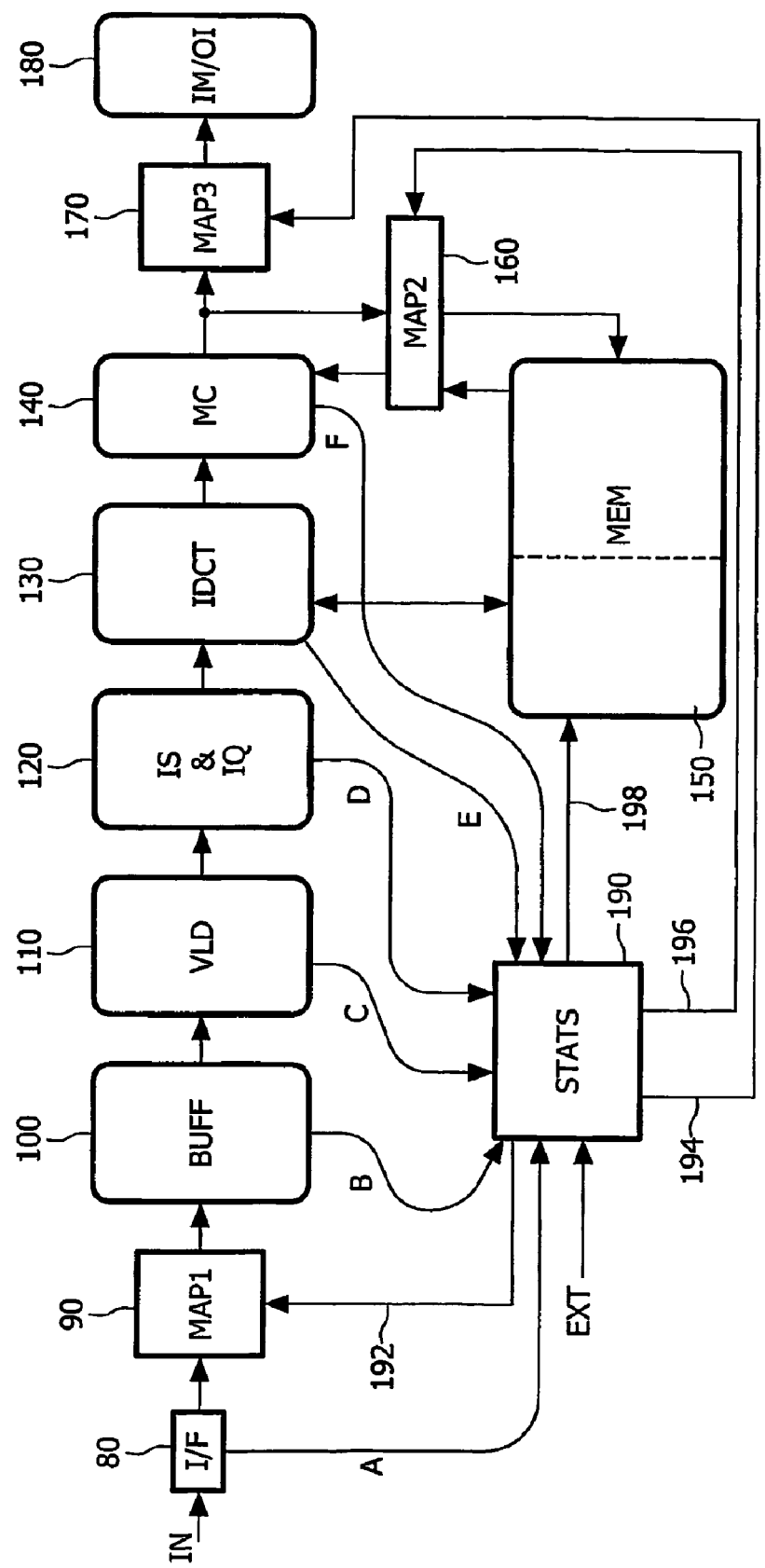
FIG. 1 is a functional block diagram of an MPEG image decoder.

FIG. 1 illustrates the various modules of an image processor performing MPEG decoding, and the additional features to support image sequence characteristic analysis and dynamic reconfiguration of image buffers and cache control. Further general considerations and detail of the reconfiguration will be described below under separate headings.

Input data IN, either in the form of analogue video, or a digital stream, is input to interface block I/F. The decoder further comprises configuration block MAP1 90, buffer BUFF 100, Variable Length Decoder (VLD) 110, Inverse Scan (IS) and Inverse Quantiser (IQ) 120, Inverse Discrete Cosine Transform (IDCT) 130, Motion Compensator (MC) 140, Image Memory MEM 150, configuration block MAP2 160, configuration block MAP3 170, Image Memory/Output Interface 180 and statistical processor STATS 190. The decoder may be implemented in dedicated hardware, or by a processor as a series of process steps, or a combination of both. The present disclosure assumes that these steps, particularly the VLD and IS/IQ steps are implemented by programming a microprocessor, which may be a general purpose microprocessor with or without media processing extensions. In the preferred implementation the processor is a VLIW processor optimised for image processing, such as Philips Semiconductors' TriMedia™ processor family.

The action of the steps shown is as follows:

Interface, at 80, is for converting the input data to a suitable digital format for MPEG decoding. Additional stages in block I/F 80 but not shown may include analogue to digital conversion, synchronisation signal extraction, gain-control blocks etc, but may also comprise interfaces for converting digital signals, depending upon the format of the input data.

Input bitstream buffering BUFF, at 100, is for receiving the video stream and forming a time-flexible queue to allow subsequent process steps to decode the video at differing rates to the input video rate (at this point audio and other data maybe separated and routed to its own decoder).

Variable Length Decoding, at 110 is for converting variable-length MPEG tokens to their corresponding values, such as quantised DCT coefficients.

Inverse Quantisation, at 120 obtains actual values for the DCT coefficients according to the values of chosen quantisation and scale factor matrices and an Inverse Scan step re-forms a coefficient matrix from the stream of tokens according to a predetermined sequence, usually a zigzag.

Inverse Discrete Cosine Transforming step 130 is for recomposing the DCT coefficients into the blocks of pixel values that they represent.

Where the image has been non-intra coded, motion compensation is performed at 140 to combine the decoded pixel values with values from reference pictures which are previously decoded neighbouring images in the image sequence.

Configuration blocks MAP1 90, MAP2 160 and MAP3 170, are used for translating address values for modifying the format of data in memory, according to control signals from the STATS block 190. As will be described in more detail below, these blocks can be implemented in software by use of parameterised memory addressing. In this way, the program code defining the processing of the image data can be written independently of the memory format actually being used at execution time, and the format can be changed and changed again simply by changing parameter values.

Memory block 150 is used by the motion compensator MC 140 to support functions such as prediction, where temporary storage of data is required.

Image Memory/Output interfacing is performed at 150 to represent the video in a suitable format such as a two dimensions video image in memory or a digital video stream, for example.

Finally, statistical processor STATS 190 is used to monitor a variety of measured data taken at different stages of processing, and to make reasoned steps to modify the formatting of data in storage elements to maximise throughput of data through the decoder. This will be referred to as "adaptive formatting".

Figure 2:
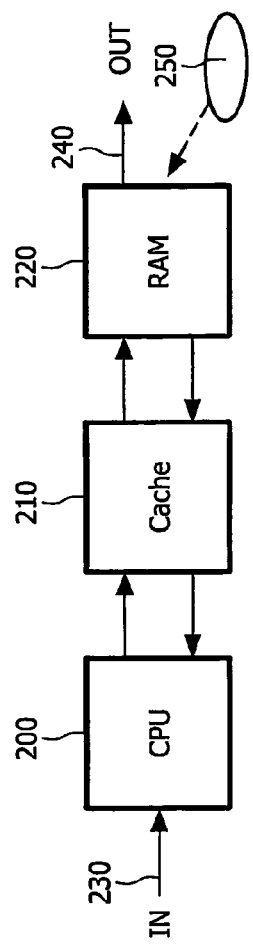
FIG. 2 is a block diagram of a processing system implementing the decoder of FIG. 1.

FIG. 2 illustrates a physical embodiment of an image processing system performing MPEG decoding. A processor 200 employs a cache 210 between it and the main memory 220. Cache 210 and main memory 220 form a memory sub-system. A cache system will typically divide the memory space into cache blocks in the same way that paged DRAM divides the available memory into pages. Data is normally transferred to the cache a cache block at a time. Minimising the number of cache blocks touched will often reduce memory system traffic and processor delays. This means that the effect of the cache system is very similar to that of a memory paging system in that minimising the number of cache blocks accessed is desirable.

CPU 200 may be the main processor of a PC workstation or it may be an auxiliary processor dedicated to MPEG decoding, or to video processing generally, such as the aforementioned TriMedia™ processor. The processor and memory may alternatively form part of a dedicated digital video apparatus such as a DVD player, video conference terminal or games console. CPU 200 is preferably performing the entire, or at least a substantial part, of the decoding process of FIG. 1. To illustrate this, the diagram shows a video bitstream IN 230 entering the processor, although another method for inputting the data would suffice, such as DMA transfers into memory. Likewise, a video output OUT 240 is shown emerging from the memory, although it could in practice require processor interaction to read, format and output the data. In operation, programs, input data and decoded images generated by CPU are held in main memory 220. As is well known, however, often-used data or process steps are loaded into and extracted from the cache 210 (when available), in preference to obtaining the same from the slower memory 220. Program code (instructions) for the processor to implement the processes described herein may be pre-installed (firmware) or may be supplied separately on a record carrier such as a CD-ROM or floppy disk 250. The use of a cache limited bandwidth of the main memory, provided that memory access operations performed together are generally to neighbouring locations.

By adaptive formatting, the aim is to dynamically configure the storage of image data in the various memories 100, 150, 180 in the most suitable format to maximise throughput, and particularly to maximise efficiency of the cache.

The apparatus, under stored program control, is capable of dynamically selecting the arrangement of the image data in the memory according to measured characteristics of the image data, measured characteristics of the performance of the processing system (which depends on the characteristics of the image data), and/or characteristics of the subsequent destination of the image data within the image processor.

The memory being dynamically configured in this embodiment is the main memory 220, as it is used for image data storage for reference pictures. It is possible to also apply the principle other functions of the memory 220, and even the processor cache 210, although the number of products currently available that allow altering of cache geometry is minimal. The image data storage memory may be static RAM, but is more likely to be paged DRAM.

The measured characteristics, which may be analysed alone or in various combinations include:

A. Measuring the variability of derived motion vectors. The measurement of variability of motion vectors can be averaged over a period of time, the results being used to determine the most appropriate storage format for the reference pictures to which the motion vectors refer. It may be more useful to measure the variability separately between vertical and horizontal planes. The reason for this is as follows: Considering a linear format, then a horizontal motion vector perturbation of (say) 8 pixels will not be onerous, since the cache block represents a region which is large horizontally (therefore, it is likely that the processor will access data from within the same cache block). Vertically, that same perturbation will require addressing a long way through memory (for a memory stride of 768 the change in memory address will be 768×8=6144 bytes) which will be a movement of many cache blocks. The vertical perturbation is much more likely to result in cache misses. If, however, the format is tiled, then the effects of horizontal and vertical motion vector perturbations are similar. These examples show that the mix of horizontal and vertical motion vector changes will affect different memory formats in different ways, and the consequent need in some cases for measuring the variability separately.

B. Acting on picture type. For example, to maximise efficiency of processing a key picture (I or P), a format that is more efficient for other pictures to predict from can be selected, such as a tiled storage format which will limit data cache stall rates when using the key pictures as reference data for a subsequent P or B picture. B pictures might all be stored in a linear format (if that is the desired output format) because those pictures will not be used as reference data in the decoder. If essentially all motion vectors are zero, or constant, then it is possible to have the key pictures stored linearly, however, because the reference data will be needed in a relatively smooth sequence.

C. Alternatively (or in addition) information can be obtained by parsing ahead through the image stream to determine characteristics of subsequent images, such as monitoring their compressed size. The compressed size may (either solely, or in combination with other measurements), be assumed to indicate to a large extent, the difficulty of processing the image. This in turn can indicate which storage format would typically be the most appropriate. For example, a relatively small amount of data may indicate an image in a sequence comprising little movement, and this in turn would suggest that linear storage may be the most appropriate.

D. Measuring (or detecting from header information within the data stream) the structure of an image from which the image data is derived (for example, whether an image frame is arranged as non-interlaced or interlaced picture lines).

E. Decoding the sequence header of the image stream for characteristics of the stream, such as image resolution. For example, an image having low resolution may be processed more efficiently using a linear organisation for storage, as many display lines can fit within the data cache and the layout is optimised for image reconstruction. However, a high resolution image would benefit from storage in a tiled format, to minimise cache stalls.

F. Measuring data cache stall rates during image reconstruction. Whatever the current memory configuration, a high cache stall rate indicates that a different memory configuration may be more appropriate.

G. Measuring processor utilisation. At times where processor time is required to perform one or more additional 'background' tasks, the arrangement of image data in the memory should be controlled to minimise processor usage. Another measured characteristic of said processor performance may comprise measuring the percentage of processor idle time.

H. Measuring, or using measurements of, quality of service, or other such qualitative measurements that are perceptible to the end user of the content being processed. An example of such would be block-noise caused by (for example) discarding data when processor capacity is inadequate, which produces visible artefacts within a reconstructed image. Block-noise and other such visible artefacts can be reduced by increasing image processor throughput.

I. Acting upon advance information to optimise storage of image data in response to forthcoming images in the image sequence. An example of such a scheme would be to have an associated data file that relates to the content of the image stream. The data file could be read in advance, and acted upon prior to the image content being processed, eliminating short-term effects caused by the inevitable lag between obtaining statistics and optimisation of the image processor.

J. Measuring, or using measurements of, bandwidth of a link feeding data into or out of the image processor. The bandwidth of an input or output link is often constrained, such as by the bandwidth of a wireless or communications link. In some cases the bandwidth varies, according to link integrity. These factors could also be taken into consideration during configuration of the image processor, although this is not done in the present embodiment.

The effects of the dynamic selection of arrangement of the image data in the memory can be monitored over a period of time, the results being used to tailor subsequent storage arrangements and maximise throughput of the image processor and/or quality of the processing. For example, a small number of macroblocks can be pre-fetched and processed, with measurements taken to provide performance statistics, the results of which are used to tailor the configuration of the image processor. Known microprocessors, such as the Philips TriMedia™, provide the measurements directly by allowing a program to monitor the number of cache misses and failed pre-fetch attempts.

The arrangement of the image data in the memory can be selected according to the destination of the image in the image processor. For example, if the image is to be output from the image processor directly to a monitor, it may be stored in a linear arrangement, but if the image is being passed to a further stage of processing which works optimally using a tiled storage arrangement then the selected arrangement of the image data would be tiled. "Skewed tiled" format may also be of interest where adjacent lines of blocks are offset to each other by a portion of block width. These and other tiled formats are described in more detail in the US patent mentioned in the introduction above.

Figure 3:
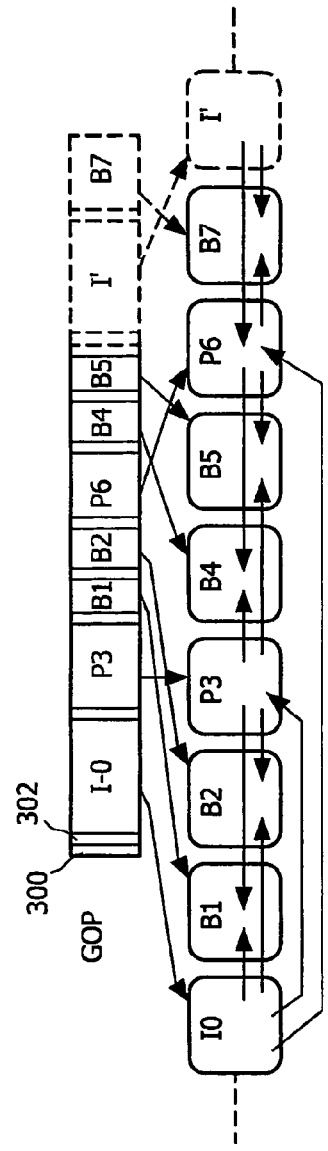
FIG. 3 illustrates the structure of an MPEG data stream, and the sequence of image frames represented therein, within the decoder of FIGS. 1 and 2.

FIG. 3 illustrates the difference between physical and temporal ordering of pictures within a Group-Of-Pictures (GOP) sequence. As is well known, pictures in MPEG-2 and other modem digital formats are encoded by reference to one and other so as to reduce temporal redundancy. Motion compensation provides an estimate of the content of one picture from the content already decoded for a neighbouring picture or pictures. Therefore a group of pictures (GOP) will typically comprise: an intra-coded "I" picture, which is coded without reference to other pictures; two or three "P" (predictive) coded pictures which are coded using motion vectors based on a preceding I picture; and bi-directional predicted "B" pictures, which are encoded by prediction from I and/or P pictures before and after them in sequence. The amount of data required for a B picture is less than that required for a P picture, which in turn is less than that required for an I picture. On the other hand, since the P and B pictures are encoded only with reference to other pictures, it is only the I pictures which provide an actual entry point for starting playback of a given sequence. Furthermore, it will be noted that the I and P pictures are encoded before the corresponding B pictures, and then re-ordered after decoding so as to achieve the correct presentation order. Decoded image data for the I (and P) pictures must be retained or retrieved into memory for use as reference data in the decoding of P and B pictures.

As is well known, information about the structure and coding of the group of pictures is contained within a GOP header 300 at the start of the data, while information about the type and coding of each picture is included in a picture header 302 at the start of the data for each picture.

Further discussion now follows, of the different ways in which the memory sub-system is organised controlled to achieve the optimised performance using techniques such as those described above with review.

Efficient Memory Layouts

The normal and obvious way to lay image data out in memory 220 is to store complete rows of pixels in display order in successive locations. This is referred to as "linear organisation" hereafter. For the purpose of this specification, luminance only is considered, for simplicity. The same general considerations will apply to chrominance data, or cases where chrominance/luminance components are interleaved. These can be handled separately, or together with luminance data for a given macroblock.

Figure 4:
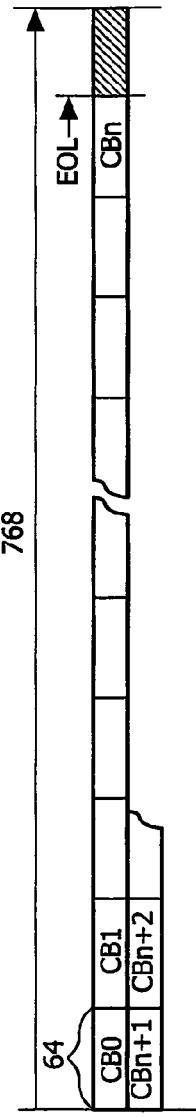
FIG. 4 illustrates a linear format of image storage in the memory of the decoder of FIGS. 1 and 2.

FIG. 4 illustrates this arrangement in example of luminance data at a horizontal resolution of 720 (common in TV systems) and a memory sub-system whose cache-block size is 64 bytes, then each line of luminance occupies 11.25 cache-blocks (CB0, CB1 etc). In order to perform cache control operations that do not have effect on adjacent lines then it is clearly advantageous to store the images in memory with unused space between the stored lines so that the memory "stride" (difference in address between the addresses of two adjacent lines) is 768 (rounded up to the nearest multiple of 64). EOL indicates the end of real data for a line of pixels. The shaded locations are unused.

Consequently, processing of each macroblock produces a 16×16 region of output data that occupies 16 cache-blocks.

Each source of prediction data must deliver at least a 16×16 block of prediction data. As a result of half pixel resolution in motion vectors, this may require a worst-case 17×17 region of source data (where the least significant bit in both horizontal and vertical components of the motion vector is set).

Figure 5:
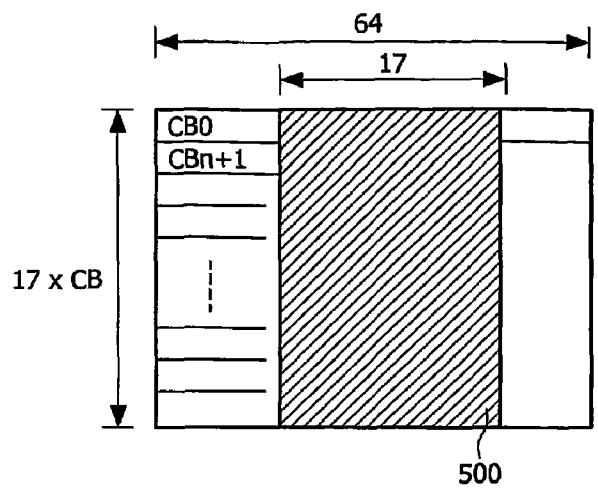
FIGS. 5 and 6 illustrate possible locations of data for a block of pixels in the linear format of image storage.
Figure 6:
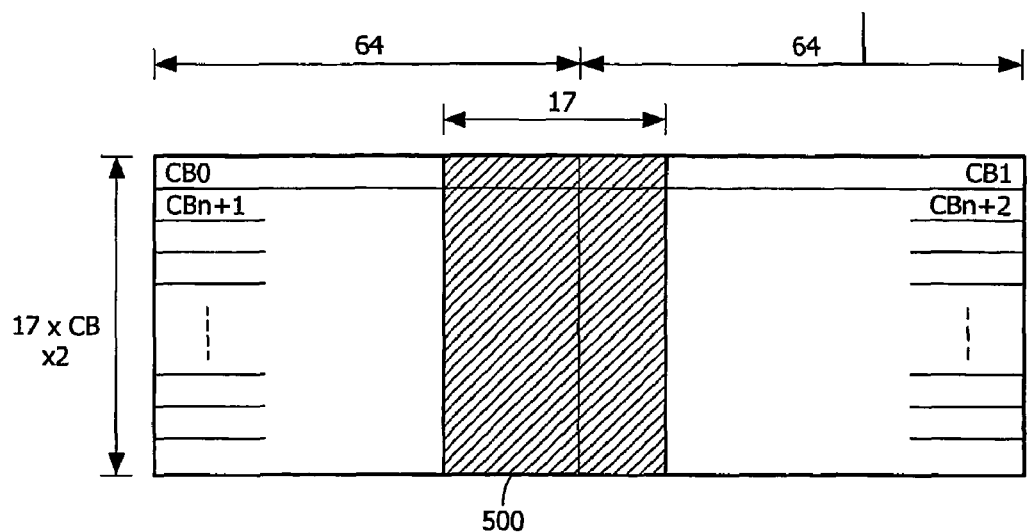

FIG. 5 shows a block 500 of 17×17 pixel data, located within 17 separate cache blocks. Unfortunately, the position of this 17×17 block of data within paged memory may not be cache-block aligned. In the case where all 17 byte wide rows of source data fit within one cache-block (FIG. 5) then 17 cache-blocks of data are required in order to have access to all the data. If, as shown in FIG. 6, these rows cross a cache-block boundary then 34 cache-blocks are required. It is likely that this cross-block occurrence will happen approximately 25% of the time, therefore the average block count will be around 21.

21 cache-blocks occupy 21×64=1344 bytes of cache. If we consider bidirectional prediction, then two data sources exist, which doubles the source data cache occupancy to 2688. The destination data occupies 16 cache-blocks, and can be guaranteed not to cross cache-blocks (assuming cache aligned display lines) so the destination data cache occupancy is 16×64=1024 bytes. Consequently, the total cache occupancy is 3712 bytes, which is small enough to fit within many processor caches.

Figure 7:
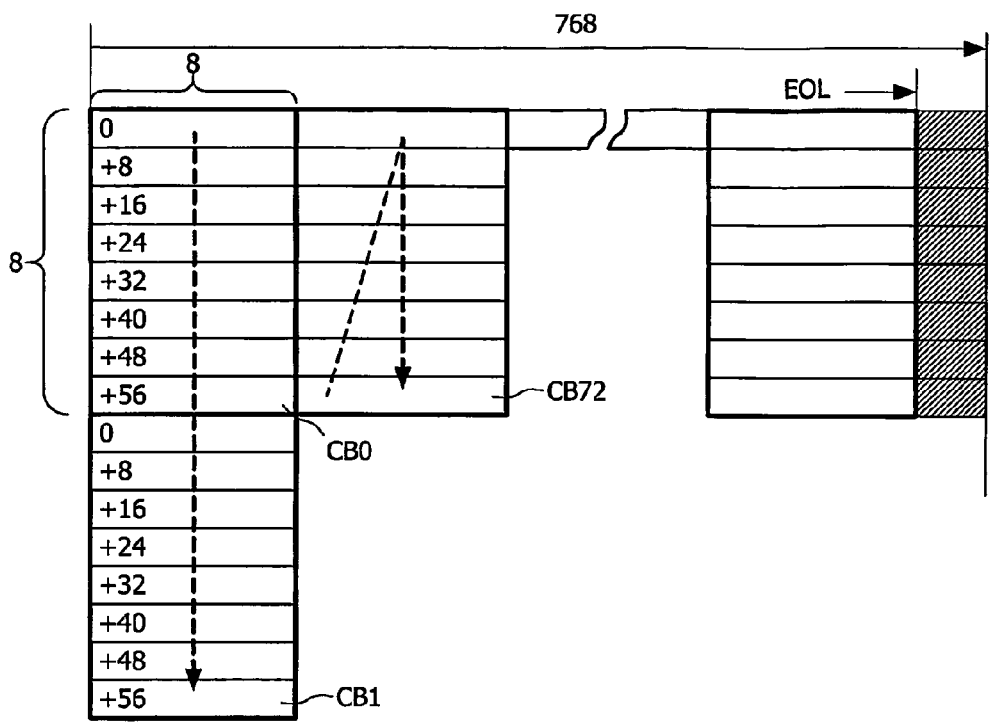
FIG. 7 illustrates a tiled format of image storage in the memory of the decoder of FIGS. 1 and 2.
Figure 8:
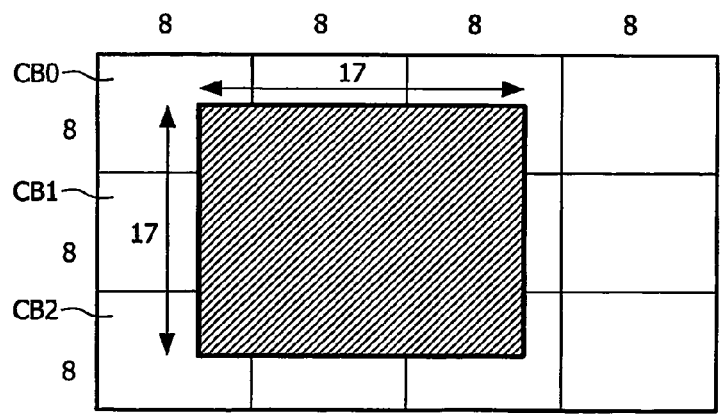
FIG. 8 illustrates locations of data for a block of pixels in the tiled format of image storage.

When a cache-block is fetched, then all 64 bytes of a cache-block will be read into the cache even though only 16 or 17 bytes will actually be needed. If motion vectors do not change between macroblocks, then the data that is unused for that block will be used for succeeding blocks. However in a 'difficult' video sequence where the motion vectors vary widely then this data may well be unused. The worst case is that no macroblock uses any of the data that was read but not used during processing of the previous macroblock, resulting in a quadrupling of the required memory bandwidth for prediction data read. This will also cause a considerable increase in the amount of data cache that will be used so that other useful data (prediction source data, prediction output data or other data not necessarily directly related to motion reconstruction) may be discarded from the cache, with a consequential waste of time when that data is needed again. The obvious result of this is degradation in image quality, if data has to be discarded to present the sequence in real time. A flexible memory-addressing scheme allows other memory structures to be implemented. FIG. 7 for example illustrates a tiled layout whereby image data is organised so that each cache-block contains an 8×8 square region ('tile') of luminance data. Given this organisation, the destination region of luminance covered by a macroblock occupies all of four cache-blocks (instead of part of 16 blocks). FIG. 8 shows how each source region of between 16×16 and 17×17 pixels will normally occupy 3×3=9 cache-blocks (will range from four to 9, as against typically 21 in the linear arrangement of FIGS. 5 and 6).

Figure 9:
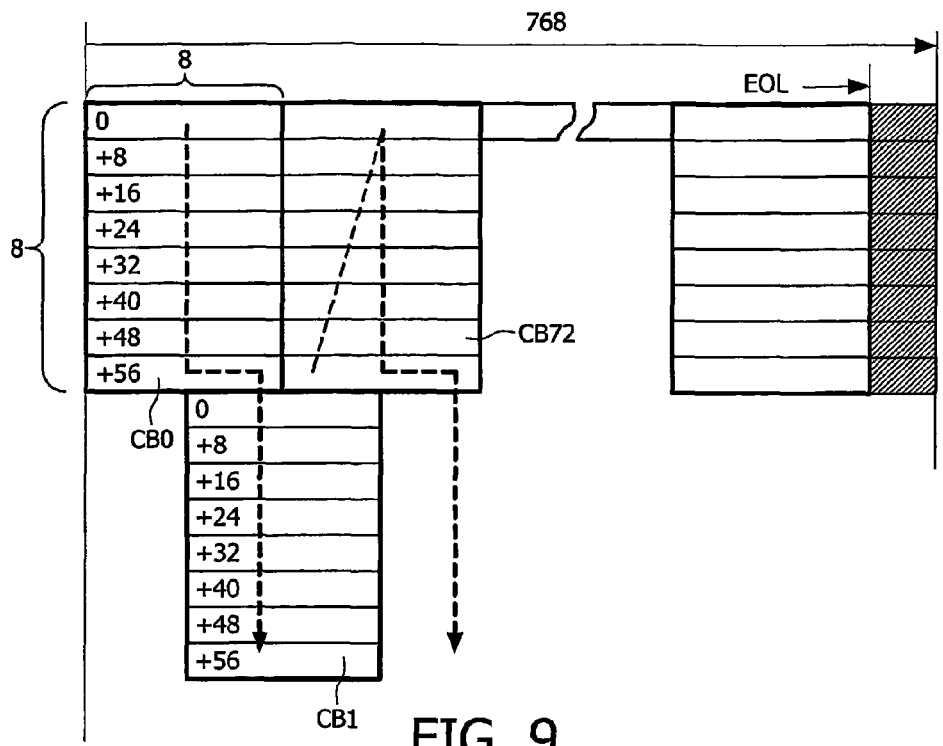
FIG. 9 illustrates a skewed-tiled format of image storage in the memory of the decoder of FIGS. 1 and 2.
Figure 10:
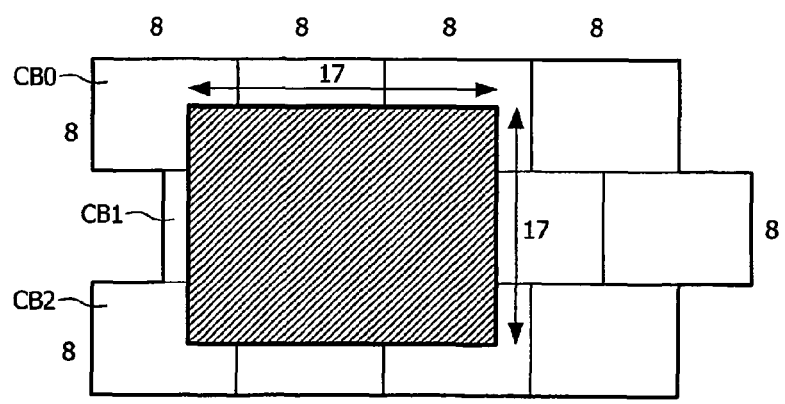
FIG. 10 illustrates locations of data for a block of pixels in the skewed-tiled format of image storage.

FIGS. 9 and 10 illustrate a skewed-tiled layout whereby image data is again organised so that each cache-block contains an 8×8 square region 'tile') of luminance data, but each alternate row is skewed by half a tile. This layout can further reduce image memory page crossings.

Experimental results show, as expected, that the tiled organisation improves performance when motion vectors are highly variable. However, the simple linear organisation works very well where the motion vectors are constant, and overhead in conversion between formats cannot be ignored.

Cache Control

Many processors have instructions which enable operation of the cache to be controlled directly by the programmer. Two examples are described here with reference to the Philips TriMedia PNX1300 processor. Cache control functions are indicated by the line 198 leading from the block STATS 190 to memory subsystem in FIG. 1. Other processors may offer equivalent or different options for the programmer to control the cache.

Cache Block Allocation

When the processor executes a store instruction, the effect is that data in a cache-block will be modified. If the memory data being modified is already in the cache then this happens at full speed. However, if this is not the case, then a new cache-block must be allocated and the modified byte written to that block. In order for the remainder of that data in that cache-block to be consistent with memory there must be a read operation to read data into the newly allocated cache-block.

In some cases the programmer will know that all the bytes in a cache-block will be overwritten and that this read operation is thus unnecessary. The read occupies memory system bandwidth. In some processor designs it may delay the processor. The TriMedia "alloc" instruction causes a new cache-block to be allocated without it being filled from memory, avoiding these problems.

However the "alloc" instruction can be dangerous. If some of the data in the block is not overwritten by the program, then the effect is that this data is lost. The program has to be written in such a manner as to be sure that none of the existing data in the memory area covered by the cache-block will be needed again.

Regarding the two memory organisations previously described, one can observe that the second (tiled) organisation is far simpler from this point of view. Each macroblock decode completely covers four cache-blocks. The other organisation partially covers 16 cache-blocks, which means that more computational complexity is required to control the use of "alloc". This may be particularly complex near the start and end of display lines. This complexity will have a computational cost that can diminish or even destroy the gain from using the cache management instruction.

Pre-fetch

This operation requests that the memory system allocates and loads a cache line with data from a specified region of memory. An advantage is that this can be called before the data is required. If the memory system has enough spare time between the moment that the pre-fetch request is issued and the time that the data is required, than the data will already be pre-fetched and the processor will not be delayed waiting for the data.

In the tile based organisation there are considerably fewer cache-blocks involved, so there is more likely to be time available for the pre-fetches to occur. There is much less data being pre-fetched in total. This is less relevant where the motion vectors are constant, and all the data will eventually be useful, but is more serious where motion vectors vary so that some of the data may never be used.

In conclusion, some memory organisations, such the tiled format, are more susceptible to successful cache optimisation than others. Again, however, the fact that there is an overhead involved in conversion to the filed format means that it is not necessarily efficient to use that format for all frames.

Parameterised Addressing

Normally different memory organisations require differently written code. One technique to avoid this is to parameterise a single common piece of code so that it can handle a variety of memory organisations.

An example illustrates one possible arrangement as applied to a TriMedia™ processor. This is a 32 bit processor, therefore it is convenient to handle data groups of four values. Each word in this case represents four adjacent values from one of the images (for example the luminance values for four horizontally adjacent pixels).

The parameterisation substitutes parameters instead of fixed constants to define the address offset which should be used when moving a certain distance in the required direction. For example to move right four values (one word of data) or to move down one row. It is likely that these parameters can be held in processor registers so that the additional cost of using them instead of constant offsets is small.

Using the linear memory layout described first above (FIGS. 5 and 6), then moving right four values within a macroblock require an addition of four to the address and moving down one means adding the memory row stride (for example 768 as discussed above, where the line length is 720 which has been rounded up to 768 for cache alignment purposes).

A description of the memory layout will assist in understanding the operation of the second, tiled, memory layout. Considering the example where the storage of luminance data is at a resolution of 720×576, each file of data will represent an 8×8 region of this image. The image is 720/8=90 tiles wide and 576/8=72 high. Each macroblock covers a 16×16 region of luminance so is two tiles in both width and height.

The tiled organisation of FIGS. 7 and 8 orders the tiles in memory in columns. So the first 64 bytes of the image buffer (the first tile in memory order) describe the top left tile of the image. The second 64 bytes in memory order describe the second tile in the first column of tiles (its first, top left, value is at horizontal pixel position zero and vertical pixel position 8). This continues until the entire column of tiles has been described. The second column of tiles then follows and so on fill then end of the luminance image buffer. With the skewed-tiled format, the tiles are still ordered in columns, but in alternate lines each tile is offset, relative to the others.

In this tiled organisation, the memory address change required to move down one row is eight. The memory address increment required to move right eight pixels is equal to the size of one column of tiles (72×8). The result of this scheme of parameterisation is that two very different memory organisations can be handled by the same code given different values for two parameters (address changes to move down one pixel and to move right eight pixels). With skewed-tiled format, clearly an offset to the row address has to be added, depending on which row is being accessed.

Where possible other layouts are achieved using more or different parameters. For example, tiles need not be 8×8 square, but could be rectangular, such as 16×4 or 4×16. The US patent mentioned in the introduction describes further shapes, including triangular tiles.

In some cases alternative versions of relevant code may be needed. For example, in some cases the parameterised method may not work because is works with blocks of four values. An example of this is a 'semi-planar' format in which the chrominance U and V values are interleaved (u0, v0, u1, v1, u2, v2, u3, v3). In this format a set of four generated U values are not written in consecutive bytes so the generic parameterised code cannot work.

Output Frame Conversion

Although a memory organisation such as the tiled one described above may be computationally efficient within the MPEG decoder, it may well not be the format required at the output. It could be that the linear organisation is more appropriate.

It is therefore advantageous to reduce the cost of fetching the prediction data used in B picture construction by structuring I and P pictures for minimum cache activity. In the example described above, this might mean the use of a tiled structure for these pictures. On the other hand the linear organisation may be what is required for image display on a screen or other operation. This means that there must be a conversion operation to take a picture organised differently and convert it to the required format. This conversion organisation can be arranged to read and write data efficiently in cache-block order and to use cache optimisation instructions such as "alloc" so that the cost of the conversion can be less than the saving in processing time in the decoder.

If the next processing stage/module in the decoder can be designed to accommodate an unusual structure then there may be no need for this conversion. For example, in some cases the next step after video decoding might be the blending of image content with subtitle data. This blending process could be adapted to read the video data in tile format with no additional cost.

Picture Types

Using MPEG-2 decoding as an example, this coding method uses three picture types (I, P and B). I and P pictures are 'key' pictures which means that they can be used as the source for motion prediction. B pictures cannot so be used, but are often the most expensive to decode because of the amount of prediction data that is used to construct them.

There is therefore advantage in using a tiled format for I and P picture while generating B pictures directly in the required output format. The processing cost will be the output image conversion which will happen for I and P pictures which are less of a performance problem. B picture processing will gain the benefit of the improved input image buffer format while not suffering the overhead of output image buffer conversion.

The parameterised addressing structure is useful here to allow the same code to be used in both cases. This reduces code size and code maintenance cost.

Some sequences are field structured. This means that each picture coded in the stream is one field of the image (either all the odd lines, or all the even lines). In order to efficiently work with sequences of this sort it can be useful to modify the memory structure to separate the fields so that field prediction will cover less cache-blocks. Again, this can be result from analysis of the stream, and dynamically selecting the most appropriate image buffer format. If the sequence is such that most prediction is field structured then it may be preferred to store the frame as two separate fields, instead of a single interleaved (interlaced) frame. This is because field prediction from a frame structured buffer would read from only every other line of data, which would mean that twice as many tiles would have to be accessed to get field prediction data (because only half of the tile will be useful). The solution to this is to hold the two fields separately in memory, so that all consecutive lines in the buffer belong to the same field.

The above description illustrates that it is possible for certain sequences to have characteristics which match one image buffer format well, but not another. This can occur because of differences in the original source video material or can be a result of different encoder strategies. Advantageously, the parameterised image buffer format supports analysis of the incoming stream and/or measured decoding performance figures so as to dynamically choose the best image buffer format for the current part of a stream. The cache control features can be controlled on the basis of the same measurements or independently, to add to the benefits.

The skilled person can readily derive a whole range of algorithms to control the memory subsystem based on the measurements and observations given above. These algorithms may be based on a single measurement or many; they may be simple or highly complex; they may be based on fixed rules, or the rules themselves may be modified automatically, so as to adapt to real data and the response of the system.

These and other modifications are possible within the spirit and scope of the invention, defined in the appended claims.

The invention claimed is:

1. A method of arranging image data representing a motion picture sequence within a memory sub-system in an image data processing system, the method comprising using a decoder to dynamically select the arrangement of image data for successive pictures of said sequence in said memory subsystem according to at least one of: measured characteristics of said image data, measured characteristics of the performance of said processing system, and known characteristics of subsequent processing of said image data within said image processing system;

wherein the measured characteristics of said image data includes at least one of:
variability of motion vectors encoded within received data,
picture type, and
image resolution;

wherein the measured characteristics of the performance of said processing system includes at least one of:
data cache stall rates for a cache memory in the memory sub-system,
processor utilization,
quality of service or other qualitative measurements that are perceptible to an end user of content being processed, and
bandwidth of a link feeding data into or out of said image processing system;

wherein the known characteristics of subsequent processing of said image data includes at least one of:
encoded data size per picture of the sequence, and
advance information relating to the content of the image stream contained in a data file;

wherein measured characteristics of the image data at one part of the sequence are used to predict characteristics of a subsequent portion of the sequence, and the memory arrangement is controlled according to measured characteristics of recently processed portions of the sequence.

2. A method as claimed in claim 1, wherein said memory sub-system includes an image data storage memory constructed from paged memory.

3. A method as claimed in claim 1, wherein said memory sub-system includes a processor cache memory in addition to a main image data storage memory.

4. A method as claimed in claim 1, wherein the step of selecting the arrangement of image data in storage memory comprises selecting between a linear format, whereby image data is stored in the memory sub-system on a line-by-line basis, and at least one kind of tiled format, whereby two-dimensional groups of pixels are grouped in the memory sub-system.

5. A method as claimed in claim 4 wherein the memory sub-system includes cache memory, said tiled format is defined such that data for one tile corresponds to a whole number of cache blocks.

6. A method as claimed in claim 1, wherein the method looks ahead in the motion picture sequence so as to measure said characteristics of the image data for a given portion of the sequence and selects the memory arrangement prior to processing that portion.

7. A method as claimed in claim 1 wherein the method further comprises averaging over a period of time the measurement of image data characteristics.

8. A method as claimed in claim 1, wherein the method includes the system performance measurement, and wherein the system performance is measured on a test basis using a sample of data, prior to processing the data.

9. A method as claimed claim 1, wherein the method includes the system performance measurement, and wherein the system performance measured while processing a first part of the sequence is used in selecting the arrangement of memory for a subsequent part of the sequence.

10. A method as claimed in claim 1, wherein the method comprises using knowledge of subsequent processing steps to influence the selection of the arrangement of data in the memory sub-system.

11. A method as claimed in claim 1, wherein the selection of memory arrangement is implemented at least partly by changing parameters used by memory-accessing program code.

12. A method as claimed in claim 1, wherein the selection of memory arrangement is implemented at least partly based upon a selection of different versions of code to be executed.

13. A method as claimed in claim 1, wherein the memory sub-system includes processor cache memory in addition to main image data storage memory, and wherein the selecting is performed using cache-handling functions.

14. A method as claimed in claim 13, wherein a block allocation function, whereby a new cache-block is allocated and overwritten without pre-loading the new cache-block from the main memory, is used selectively according to said measured characteristics.

15. A method as claimed in claim 13, wherein, in addition, cache pre-fetching is activated selectively in accordance with the measured characteristics.

16. An image data processing system, the processing system including a memory sub-system and a decoder that dynamically selects an arrangement of image data for successive frames of a motion picture sequence within said memory sub-system according to at least one of: measured characteristics of said image data, measured characteristics of the performance of said processing system, and known characteristics of subsequent processing of said image data within said image processing system;
wherein the measured characteristics of said image data includes at least one of:
variability of motion vectors encoded within received data,
picture type, and
image resolution;
wherein the measured characteristics of the performance of said processing system includes at least one of:
data cache stall rates in the memory sub-system,
processor utilization,
quality of service or other qualitative measurements that are perceptible to an end user of content being processed, and
bandwidth of a link feeding data into or out of said image processing system;
wherein the known characteristics of subsequent processing of said image data includes at least one of:
encoded data size per picture of the sequence, and
advance information relating to the content of the image stream contained in a data file;
wherein the decoder is arranged for selecting between a linear format, whereby image data is stored in the memory sub-system on a line-by-line basis, and at least one kind of tiled format, whereby two-dimensional groups of pixels are grouped in the memory sub-system.

17. A system as claimed in claim 16, wherein where the memory sub-system includes cache memory, said tiled format is defined such that data for one tile corresponds to a whole number of cache blocks.

18. The system of claim 17, wherein the measured characteristics of said image data comprise the picture type.

19. The system of claim 16, wherein the measured characteristics of said image data comprise the variability of motion vectors encoded within received data.

20. A system as claimed in claim 19, wherein the variability of motion vectors is measured separately between vertical and horizontal planes, each having a different effect in the selection of the storage arrangement.

21. A system as claimed in claim 16, wherein the memory sub-system includes an image data storage memory constructed from paged memory.

22. An image data processing system, the processing system including a memory sub-system and a decoder that dynamically selects an arrangement of image data for successive frames of a motion picture sequence within said memory sub-system according to at least one of: measured characteristics of said image data, measured characteristics of the performance of said processing system, and known characteristics of subsequent processing of said image data within said image processing system;
wherein the measured characteristics of said image data includes at least one of:
variability of motion vectors encoded within received data,
picture type, and
image resolution;
wherein the measured characteristics of the performance of said processing system includes at least one of:
data cache stall rates in the memory sub-system,
processor utilization,
quality of service or other qualitative measurements that are perceptible to an end user of content being processed, and
bandwidth of a link feeding data into or out of said image processing system;
wherein the known characteristics of subsequent processing of said image data includes at least one of:

encoded data size per picture of the sequence, and
advance information relating to the content of the image stream contained in a data file;

wherein the decoder is arranged to look ahead in the motion picture sequence so as to measure said characteristics of the image data for a given portion of the sequence and select the memory arrangement prior to processing that portion.

23. A system as claimed in claim 22, wherein the decoder is implemented at least partly by means for changing parameters used in accessing said memory sub-system.

24. The system of claim 22, wherein the measured characteristics of said image data comprise the image resolution.

25. An image data processing system, the processing system including a memory sub-system and a decoder that dynamically selects an arrangement of image data for successive frames of a motion picture sequence within said memory sub-system according to at least one of: measured characteristics of said image data, measured characteristics of the performance of said processing system, and known characteristics of subsequent processing of said image data within said image processing system;
wherein the measured characteristics of said image data includes at least one of:
variability of motion vectors encoded within received data,
picture type, and
image resolution;
wherein the measured characteristics of the performance of said processing system includes at least one of:
data cache stall rates in the memory sub-system,
processor utilization,
quality of service or other qualitative measurements that are perceptible to an end user of content being processed, and
bandwidth of a link feeding data into or out of said image processing system;
wherein the known characteristics of subsequent processing of said image data includes at least one of:
encoded data size per picture of the sequence, and
advance information relating to the content of the image stream contained in a data file;
wherein the decoder is arranged such that measured characteristics of the image data at one part of the sequence are used effectively to predict characteristics of a subsequent portion of the sequence, and the memory arrangement is controlled according to measured characteristics of recently processed portions of the sequence.

26. A system as claimed in claim 25, wherein the decoder comprises dedicated hardware or a processor.

27. The system of claim 25, wherein the measured characteristics of the performance of said processing system comprise the data cache stall rates for a cache memory in the memory sub-system.

28. An image data processing system, the processing system including a memory sub-system and a decoder that dynamically selects an arrangement of image data for successive frames of a motion picture sequence within said memory sub-system according to at least one of: measured characteristics of said image data, measured characteristics of the performance of said processing system, and known characteristics of subsequent processing of said image data within said image processing system;
wherein the measured characteristics of said image data includes at least one of:
variability of motion vectors encoded within received data,
picture type, and
image resolution;
wherein the measured characteristics of the performance of said processing system includes at least one of:
data cache stall rates in the memory sub-system,
processor utilization,
quality of service or other qualitative measurements that are perceptible to an end user of content being processed, and
bandwidth of a link feeding data into or out of said image processing system;
wherein the known characteristics of subsequent processing of said image data includes at least one of:
encoded data size per picture of the sequence, and
advance information relating to the content of the image stream contained in a data file;
the processing system further including:
a measuring component arranged to measure variability of motion vectors, wherein the measuring component is arranged to measure separately between vertical and horizontal planes, each having a different effect in the selection of the storage arrangement.

29. The system of claim 28, wherein the measured characteristics of the performance of said processing system comprise the processor utilization.

30. The system of claim 28, wherein the measured characteristics of the performance of said processing system comprise the quality of service or other qualitative measurements that are perceptible to an end user of content being processed.

31. An image data processing system, the processing system including a memory sub-system and a decoder that dynamically selects an arrangement of image data for successive frames of a motion picture sequence within said memory sub-system according to at least one of: measured characteristics of said image data, measured characteristics of the performance of said processing system, and known characteristics of subsequent processing of said image data within said image processing system;
wherein the measured characteristics of said image data includes at least one of:
variability of motion vectors encoded within received data,
picture type, and
image resolution;
wherein the measured characteristics of the performance of said processing system includes at least one of:
data cache stall rates in the memory sub-system,
processor utilization,
quality of service or other qualitative measurements that are perceptible to an end user of content being processed, and
bandwidth of a link feeding data into or out of said image processing system;
wherein the known characteristics of subsequent processing of said image data includes at least one of:
encoded data size per picture of the sequence, and
advance information relating to the content of the image stream contained in a data file;
the processing system further including:
a measuring component that measures system performance at least partly on a test basis using a sample of data, prior to processing the data.

32. A system as claimed in claim 31, wherein said memory sub-system includes a processor cache memory in addition to an image data storage memory.

33. A system as claimed in claim 31, wherein the measuring component averages measured image data characteristics over period of time.

34. A system as claimed in claim 31, wherein the decoder comprises dedicated hardware or a processor.

35. A system as claimed in claim 31, wherein the memory sub-system includes a processor cache memory in addition to main image data storage memory, and wherein the selecting is performed using cache-handling functions.

36. The system of claim 31, wherein the measured characteristics of said image data comprise the variability of motion vectors encoded within received data.

37. The system of claim 31, wherein the measured characteristics of said image data comprise the picture type.

38. The system of claim 31, wherein the measured characteristics of said image data comprise the image resolution.

39. The system of claim 31, wherein the measured characteristics of the performance of said processing system comprise the data cache stall rates for a cache memory in the memory sub-system.

40. The system of claim 31, wherein the measured characteristics of the performance of said processing system comprise the processor utilization.

41. The system of claim 31, wherein the measured characteristics of the performance of said processing system comprise the quality of service or other qualitative measurements that are perceptible to an end user of content being processed.

42. The system of claim 31, wherein the measured characteristics of the performance of said processing system comprise the bandwidth of a link feeding data into or out of said image processing system.

43. The system of claim 31, wherein the known characteristics comprise the encoded data size per picture of the sequence.

44. The system of claim 31, wherein the known characteristics comprise the advance information relating to the content of the image stream contained in a data file.

45. A non-transitory computer readable instruction medium with instructions for causing a data processing system to implement a method of arranging image data representing a motion picture sequence within a memory sub-system in an image data processing system, the method comprising:
dynamically selecting the arrangement of image data for successive pictures of said sequence in said memory sub-system according to at least one of: measured characteristics of said image data, measured characteristics of the performance of said processing system, and known characteristics of subsequent processing of said image data within said image processing system;
wherein the measured characteristics of said image data includes at least one of:
variability of motion vectors encoded within received data,
picture type, and
image resolution;
wherein the measured characteristics of the performance of said processing system includes at least one of:
data cache stall rates for a cache memory in the memory sub-system,
processor utilization,
quality of service or other qualitative measurements that are perceptible to an end user of content being processed, and
bandwidth of a link feeding data into or out of said image processing system;
wherein the known characteristics of subsequent processing of said image data includes at least one of:
encoded data size per picture of the sequence, and
advance information relating to the content of the image stream contained in a data file;
wherein measured characteristics of the image data at one part of the sequence are used to predict characteristics of a subsequent portion of the sequence, and the memory arrangement is controlled according to measured characteristics of recently processed portions of the sequence.

46. An image data processing system, the processing system including a memory sub-system and a decoder that dynamically selects an arrangement of image data for successive frames of a motion picture sequence within said memory sub-system according to at least one of: measured characteristics of said image data, measured characteristics of the performance of said processing system, and known characteristics of subsequent processing of said image data within said image processing system;
wherein the measured characteristics of said image data includes at least one of:
variability of motion vectors encoded within received data,
picture type, and
image resolution;
wherein the measured characteristics of the performance of said processing system includes at least one of:
data cache stall rates in the memory sub-system,
processor utilization,
quality of service or other qualitative measurements that are perceptible to an end user of content being processed, and
bandwidth of a link feeding data into or out of said image processing system;
wherein the known characteristics of subsequent processing of said image data includes at least one of:
encoded data size per picture of the sequence, and
advance information relating to the content of the image stream contained in a data file;
wherein the decoder and a measuring component that measures system performance are arranged such that system performance measured while processing a first part of the sequence is used to influence the arrangement of the memory sub-system for a subsequent part of the sequence.

47. The system of claim 46, wherein the measured characteristics of the performance of said processing system comprise the bandwidth of a link feeding data into or out of said image processing system.

48. An image data processing system, the processing system including a memory sub-system and a decoder that dynamically selects an arrangement of image data for successive frames of a motion picture sequence within said memory sub-system according to at least one of: measured characteristics of said image data, measured characteristics of the performance of said processing system, and known characteristics of subsequent processing of said image data within said image processing system;
wherein the measured characteristics of said image data includes at least one of:
variability of motion vectors encoded within received data,
picture type, and
image resolution;
wherein the measured characteristics of the performance of said processing system includes at least one of:
data cache stall rates in the memory sub-system,
processor utilization,
quality of service or other qualitative measurements that are perceptible to an end user of content being processed, and bandwidth of a link feeding data into or out of said image processing system;
wherein the known characteristics of subsequent processing of said image data includes at least one of:
encoded data size per picture of the sequence, and
advance information relating to the content of the image stream contained in a data file;
wherein the decoder uses knowledge of a set of subsequent processing steps to influence the selection of the arrangement of data in the memory sub-system.

49. An image data processing system, the processing system including a memory sub-system and a decoder that dynamically selects an arrangement of image data for successive frames of a motion picture sequence within said memory sub-system according to at least one of: measured characteristics of said image data, measured characteristics of the performance of said processing system, and known characteristics of subsequent processing of said image data within said image processing system;
wherein the measured characteristics of said image data includes at least one of:
variability of motion vectors encoded within received data,
picture type, and
image resolution;
wherein the measured characteristics of the performance of said processing system includes at least one of:
data cache stall rates in the memory sub-system,
processor utilization,
quality of service or other qualitative measurements that are perceptible to an end user of content being processed, and
bandwidth of a link feeding data into or out of said image processing system;
wherein the known characteristics of subsequent processing of said image data includes at least one of:
encoded data size per picture of the sequence, and
advance information relating to the content of the image stream contained in a data file;
wherein the memory sub-system includes a processor cache memory in addition to main image data storage memory, and wherein the selecting is performed using cache-handling functions;
wherein the system is arranged such that a block allocation function, whereby a new cache-block is allocated and overwritten without pre-loading the new cache-block from the main memory, is selectively used according to said measured characteristics.

50. A system as claimed in claim 49, wherein the system is arranged such that cache pre-fetching is activated selectively in accordance with the measured characteristics.

51. The system of claim 49, wherein the known characteristics comprise the encoded data size per picture of the sequence.

52. The system of claim 49, wherein the known characteristics comprise the advance information relating to the content of the image stream contained in a data file.

* * * * *